United States Patent
Schlegel

[11] 3,738,735
[45] June 12, 1973

[54] LENS FOR NIGHT VISION APPARATUS
[75] Inventor: Franz Schlegel, Munich, Germany
[73] Assignee: Optische Werke G. Rodenstock, Munich, Germany
[22] Filed: July 21, 1971
[21] Appl. No.: 164,753

Related U.S. Application Data
[63] Continuation-in-part of Ser. No. 45,640, June 12, 1970, abandoned.

[30] Foreign Application Priority Data
July 21, 1971 Germany.................. P 20 36 298.5

[52] U.S. Cl................. 350/214, 350/176, 350/209
[51] Int. Cl. ............................................. G02b 9/00
[58] Field of Search...................... 350/214, 209, 176

[56] References Cited
FOREIGN PATENTS OR APPLICATIONS
| | | | |
|---|---|---|---|
| 1,299,129 | 7/1969 | Germany | 350/214 |
| 1,428,184 | 1/1966 | France | 350/214 |
| 1,275,302 | 8/1968 | Germany | 350/214 |
| 1,294,059 | 4/1969 | Germany | 350/214 |
| 6,605,996 | 2/1967 | Netherlands | 350/214 |

Primary Examiner—David Schonberg
Assistant Examiner—Paul A. Saejer

[57] ABSTRACT

An objective for night vision apparatus with a positive curvature of field whose radius corresponds approximately to the focal distance and which has a ratio of lens aperture of up to about 1:1.1, preferably 1:1.3, and a field angle of about 50° for visible rays, which comprises a converging meniscus-shaped collective lens as the front lens, a first cemented diverging meniscus following the front lens which in turn is adjoined by a second diverging meniscus that is uncemented and consists of a single lens; the diaphragm space is enclosed between two meniscus lenses, while the second meniscus lens is adjoined by three collecting lenses which, in turn, are followed by two Smyth lenses.

2 Claims, 1 Drawing Figure

PATENTED JUN 12 1973
3,738,735
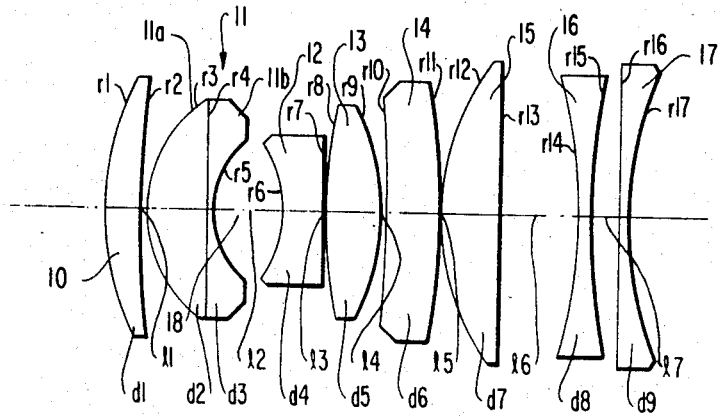
INVENTOR
FRANZ SCHLEGEL
BY Craig, Antonelli & Hill
ATTORNEYS

LENS FOR NIGHT VISION APPARATUS

This application is a continuation-in-part application of the application Ser. No. 45,640, filed on June 12, 1970 now abandoned.

The present invention relates to a lens for night vision apparatus with a positive curvature of field, whose radius corresponds approximately to the focal distance, with a ratio of lens aperture up to about 1:1.1, preferably about 1:1.3 and with a field angle of about 50° for visible rays.

Such types of objectives are used in connection with passive night vision apparatus which are intended to reproduce far-distant objects in very dim lighting on the cathode side of an image amplifying tube curved convexly in the direction toward the objective. Such lenses have generally a ratio of lens aperture of about 1.3 and a field angle of about 52°. The radius of the curvature of field is approximately equal to the focal distance or only slightly larger so that these lenses require two Smyth field lenses.

The objective of the present invention solves the problem to produce with visible but very weak light rays a sharp image of far-distant objects on the photocathode of an image tube amplifier which is convex with respect to the objective. In addition to this positive curvature of field, whose radius corresponds approximately to the focal distance, a barrel-shaped distortion of about 5 percent referred to one-half of a field angle of about 25°, is required which compensates for the approximately equal pin-cushion-shaped distortion of the following photocathode tube.

In addition to a ratio of lens aperture of 1:1.3 and a field angle of about 50°, and more particularly of about 52°, it is desirable to place the entrance pupil and therewith the diaphragm as close to the front lens as possible in order that prisms, mirrors and the like arranged in front of the front lens need not become excessively larger and heavy. This requires that with a modified Gauss objective, only one single collective lens is provided on the side of the object space (infinity) in front of the meniscus-shaped, essentially diverging lenses surrounding the diaphragm whereas on the side of the back focal length three collective lenses as well as two Smyth lenses producing the positive curvature of field follow the meniscus lenses; the second Smyth lens is preferably plano-concave and serves simultaneously as terminal glass surface and cathode support of the image amplifier tube.

Numerous modified Gauss objectives are known as such in the prior art which are provided with only three lenses in front of the diaphragm, i.e., one cemented diverging meniscus lens and a single collective lens, and in which on the side of the back focal length several individual collective lenses are provided. Even though these prior art objectives fulfill the requisite of an entrance pupil displaced toward the object space (infinity), they do not fulfill the requirement of a positively curved image surface. Additionally, these prior art objectives do not fulfill the image qualities the present invention seeks to achieve.

Another objective intended for infrared rays with an aperture ratio of 1:1 which has a positively curved image surface for the adaptation to an image converter tube, as disclosed in German Pat. No. 1,128,678, includes a number of individual collective lenses on the side of the back focal length and also a Smyth lens; however, this prior art system also includes two individual collective lenses on the side of the object space (infinity), therefore does not fulfill the requirements as regards the entrance pupil and above all, also not the requirements of a high image sharpness. Since, by reason of the longer wavelengths of the infrared rays, the refraction is at least twice as great as for visible rays, the geometric correction also does not have to be perfected to the same extent. Consequently, such prior art objective cannot fulfill the requirements made of the system in accordance with the present invention and also does not propose any solution for the necessary correction.

An objective of this type has also become known in the German Pat. No. 1,299,129 and includes two cemented meniscus lenses concave toward the diaphragm, which are enclosed on the side of the object space (infinity) by one lens and on the tube side by three collective or condenser lenses arranged one behind the other which are followed by the two aforementioned Smyth lenses. Consequently, this prior art lens is relatively costly.

Compared to this known system, the objective of the present invention is improved insofar as one cementing surface and therewith one lens is dispensed with. Additionally, the image output is improved in the sense of a reproduction with greater contrast of high local frequencies and therebeyond the pin-cusion-shaped distortion, which compensates the barrel-shaped distortion of the image tube and amounts in the case of the objective according to the present invention to about 7 percent for the peripheral ray of the image field.

The aim of the present invention is to provide a lens suitable for passive night vision apparatus which produces an improved image output with simplified construction compared to the prior art lenses.

The underlying problems are solved according to the present invention by a lens having a construction as described more fully hereinafter, which conforms to the data also indicated hereinafter.

Accordingly, it is an object of the present invention to provide an objective for night vision apparatus which eliminates the aforementioned shortcomings and drawbacks encountered in the prior art.

Another object of the present invention resides in an objective for night vision apparatus which is more simple and utilizes fewer parts.

A further object of the present invention resides in an objective of the type described above which dispenses with one lens compared to the prior art lenses, yet insures an improved image output.

Still a further object of the present invention resides in an objective for night vision apparatus which assures an improved image output particularly as regards improved contrast of high local frequencies and pin-cushion distortion of the system.

These and further objects, features and advantages of the present invention will become more apparent from the following description, when taken in connection with the accompanying drawing which shows, for purposes of illustration only, one embodiment in accordance with the present invention, and wherein:

The single FIGURE is a schematic side elevational view of the lens system of an objective for a night vision apparatus in accordance with the present invention.

Referring now to the single FIGURE of the drawing, the front lens 10 is formed by a converging meniscus lens forming a collective lens. The front lens 10 is followed by a cemented diverging meniscus lens generally designated by reference numeral 11 and consisting of lens elements 11a and 11b, cemented together in a conventional manner along the surfaces $r_4$ thereof. The diaphragm space 18 is enclosed by the concave surface $r_5$ of the diverging meniscus lens 11 and by the concave surface $r_6$ of the substantially diverging meniscus lens 12. The latter is adjoined by three collective or condenser lenses 13, 14 and 15 which, in turn, are followed by two Smyth lenses 16 and 17, the former being a biconcave lens and the latter a plano-concave lens.

The data of the lens system of two embodiments in accordance with the present invention is indicated in the following tabulations in which $r$ with appropriate suffix refers to the radius of curvature of a given lens element, $d$ with appropriate suffix refers to the thickness of a given lens element along the axis thereof, and $l$ with appropriate suffix refers to the distance along the axis between the surfaces of adjacent lens elements:

EXAMPLE 1

$f = 100$; $s' = 0$; lens aperture ratio = 1/1.3

$n_c/\nu_e$

| | | |
|---|---|---|
| $r_1$ +85.5 | | |
| | $d_1$ 12.6 | 1.855/23.6 |
| $r_2$ +332 | | |
| | $l_1$ 0.18 | |
| $r_3$ +41.9 | | |
| | $d_2$ 19.0 | 1.886/40.8 |
| $r_4$ +1556 | | |
| | $d_3$ 1.8 | 1.928/21.3 |
| $r_5$ +26.78 | | |
| | $l_2$ 14.6 +6.3 Diaphragm Space | |
| $r_6$ − 48.75 | | |
| | $d_4$ 15.1 | 1.855/23.6 |
| $r_7$ − 956 | | |
| | $l_3$ 0.18 | |
| $r_8$ +250.8 | | |
| | $d_5$ 15.8 | 1.857/32.0 |
| $r_9$ − 72.7 | | |
| | $l_4$ 0.18 | |
| $r_{10}$ − 515 | | |
| | $d_6$ 18.0 | 1.748/44.5 |
| $r_{11}$ − 210.2 | | |
| | $l_5$ 0.18 | |
| $r_{12}$ +76.2 | | |
| | $d_7$ 18.0 | 1.748/44.5 |
| $r_{13}$ +2471 | | |
| | $l_6$ 24.05 | |
| $r_{14}$ − 139.9 | | |
| | $d_8$ 4.5 | 1.928/21.3 |
| $r_{15}$ +261.7 | | |
| | $l_7$ 8.20 | |
| $r_{16}$ ∞ | | |
| | $d_9$ 3.0 | 1.510/61.0 Image Tube Wall |
| $r_{17}$ +114.3 | | |

EXAMPLE 2

$f' = 55.503$; $s' = 0$; lens aperture ratio = 1 : 1.33

$n_c/\nu_e$

| | | |
|---|---|---|
| $r_1$ +47.49 | | |
| | $d_1 = 7.00$ | 1.855/23.64 |
| $r_2$ +184.34 | | |
| | $l_1 = 0.08$ | |
| $r_3$ +23.29 | | |
| | $d_2 = 10.55$ | 1.886/40.77 |
| $r_4$ +865.95 | | |
| | $d_3 = 1.00$ | 1.928/21.34 |
| $r_5$ +14.85 | | |
| | $l_2 = 8.11$ +3.50 (diaphragm space) | |
| $r_6$ − 27.09 | | |
| | $d_4 = 8.40$ | 1.855/23.64 |
| $r_7$ − 530.87 | | |
| | $l_3 = 0.05$ | |
| $r_8$ +161.37 | | |
| | $d_5 = 8.75$ | 1.856/31.98 |
| $r_9$ − 40.83 | | |
| | $l_4 = 0.07$ | |
| $r_{10}$ − 430.90 | | |
| | $d_6 = 9.00$ | 1.748/44.49 |
| $r_{11}$ − 127.26 | | |
| | $l_5 = 0.03$ | |
| $r_{12}$ +46.14 | | |
| | $d_7 = 11.00$ | 1.748/44.49 |
| $r_{13}$ − 405.33 | | |
| | $l_6 = 13.40$ | |
| $r_{14}$ − 77.74 | | |
| | $d_8 = 2.50$ | 1.928/21.34 |
| $r_{15}$ +145.38 | | |
| | $l_7 = 4.54$ | |
| $r_{16}$ ∞ | | |
| | $d_9 = 1.65$ | 1.510/60.98 (Image Tube Wall) |
| $r_{17}$ +63.50 | | |

The data indicated above is in suitable units, referred to a focal length $f = 100$ in example 1 and $f' = 55.503$ in example 2, whereby the power of refraction of the surfaces do not deviate by more than about 5 percent from the overall power of refraction of the objective, the refraction coefficients do not deviate by more than about ± 0.05 and the N$u$ values by not more than ± 5, while $n$ refers to the coefficient of refraction, the suffix $c$ thereof indicates light color and $e$ indicates the value for the dispersion in the range of the d-line, $\nu_e$ being also expressed as $\nu_e = (n_e - 1/n_f - n_c)$ where $n_e$ and $n_f$ are Frauenhofer absorption lines for sodium and hydrogen.

The radius of curvature $r_{17}$ corresponds to the convex surface of the photocathode of an image amplifier tube. The objective of the present invention produces a sharp image of far-distant objects on the photocathode, convex toward the objective, of an image amplifier tube of conventional construction by means of visible but very weak light rays. A positive curvature of field is produced by the objective of the present invention whose radius corresponds approximately to the focal distance of the system.

In order to fulfill all of the aforementioned requirements, especially in order to keep also relatively high the control of small image details by a correction low in zones, lenses are utilized throughout whose refractive index amounts to at least 1.7, preferably about 1.74.

The lens system according to the present invention, compared to the hitherto-known objectives, includes only one cemented surface and therewith one lenses less than the prior art objectives. Additionally, the objective of the present invention produces an improved image output in the sense of higher contrast images or reproductions of high local frequencies. The pincushion-shaped distortion, which compensates the barrel-shaped distortion of the image converter and which amounts in the lens system according to the present invention to 7 percent for the edge rays of the image field, is improved.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An objective for night vision apparatus with a positive curvature of field whose radius corresponds approximately to the focal distance, with a ratio of lens aperture of about 1:1.3 and a field angle of about 50° for visible rays, characterized by the following data $f = 100$; $s' = 0$; lens aperture ratio = 1/1.3

| | | $n_e/v_e$ |
|---|---|---|
| $r_1$ +85.5 | | |
| | $d_1$ 12.6 | 1.855/23.6 |
| $r_2$ +332 | | |
| | $l_1$ 0.18 | |
| $r_3$ +41.9 | | |
| | $d_2$ 19.0 | 1.886/40.8 |
| $r_4$ +1156 | | |
| | $d_3$ 1.8 | 1.928/21.3 |
| $r_5$ +26.78 | | |
| | $l_2$ 14.6+6+6.3 | Diaphragm Space |
| $r_6$ −48.75 | | |
| | $d_4$ 15.1 | 1.855/23.6 |
| $r_7$ −956 | | |
| | $l_3$ 0.18 | |
| $r_8$ +250.8 | | |
| | $d_5$ 15.8 | 1.857/32.0 |
| $r_9$ −72.7 | | |
| | $l_4$ 0.18 | |
| $r_{10}$ −515 | | |
| | $d_6$ 18.0 | 1.748/44.5 |
| $r_{11}$ −210.2 | | |
| | $l_5$ 0.18 | |
| $r_{12}$ +76.2 | | |
| | $d_7$ 18.0 | 1.748/44.5 |
| $r_{13}$ +2471 | | |
| | $l_6$ 24.05 | |
| $r_{14}$ −139.9 | | |
| | $d_8$ 4.5 | 1.928/21.3 |
| $r_{15}$ +261.7 | | |
| | $l_7$ 8.20 | |
| $r_{16}$ ∞ | | |
| | $d_9$ 3.0 | 1.510/61.0 Image Tube Wall |
| $r_{17}$ +114.3 | | |

2. An objective for night vision apparatus with a positive curvature of field whose radius corresponds approximately to the focal distance, with a ratio of lens aperture of up to 1:1.1 and a field angle of about 50° for visible rays, characterized by the following data in any desired units $f' = 55.503$; $s' = 0$; lens aperture ratio = 1:1.33

| | | $n_e/v_e$ |
|---|---|---|
| $r_1$ +47.49 | | |
| | $d_1$ = 7.00 | 1.855/23.64 |
| $r_2$ +184.34 | | |
| | $l_1$ = 0.08 | |
| $r_3$ +23.29 | | |
| | $d_2$ = 10.55 | 1.886/40.77 |
| $r_4$ +865.95 | | |
| | $d_3$ = 1.00 | 1.928/21.34 |
| $r_5$ +14.85 | | |
| | $l_2$ = 8.11 + 3.50 | (Diaphragm Space) |
| $r_6$ −27.09 | | |
| | $d_4$ = 8.40 | 1.855/23.64 |
| $r_7$ −530.87 | | |
| | $l_3$ = 0.05 | |
| $r_8$ +161.37 | | |
| | $d_5$ = 9.75 8.75 | 1.856/31.98 |
| $r_9$ −40.83 | | |
| | $l_4$ = 0.07 | |
| $r_{10}$ −430.90 | | |
| | $d_6$ = 9.00 | 1.748/44.49 |
| $r_{11}$ −127.26 | | |
| | $l_5$ = 0.03 | |
| $r_{12}$ +46.14 | | |
| | $d_7$ = 11.00 | 1.748/44.49 |
| $r_{13}$ −405.33 | | |
| | $l_6$ = 13.40 | |
| $r_{14}$ −77.74 | | |
| | $d_8$ = 2.50 | 1.928/21.34 |
| $r_{15}$ +145.38 | | |
| | $l_7$ = 4.54 | |
| $r_{16}$ ∞ | | |
| | $d_9$ = 1.65 | 1.510/60.98 (Image Tube Wall) |
| $r_{17}$ +63.50 | | |

* * * * *

UNITED STATES PATENT OFFICE
CERTIFICATE OF CORRECTION

Patent No. 3,738,735     Dated June 12, 1973

Inventor(s) Franz SCHLEGEL

It is certified that error appears in the above-identified patent and that said Letters Patent are hereby corrected as shown below:

Title page as it now reads:

[30] Foreign Application Priority Data

July 21, 1971   Germany ......... P 20 36 298.5

Title page as it should read:

[30] Foreign Application Priority Data

July 22, 1970  Germany .......... P 20 36 298.5

Signed and sealed this 25th day of December 1973.

(SEAL)
Attest:

EDWARD M. FLETCHER, JR.    RENE D. TEGTMEYER
Attesting Officer           Acting Commissioner of Patents